(12) United States Patent
Huang

(10) Patent No.: US 8,213,162 B2
(45) Date of Patent: Jul. 3, 2012

(54) PROTECTIVE COVER MECHANISM AND ELECTRONIC DEVICE USING THE SAME

(75) Inventor: Guo-Zhao Huang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 190 days.

(21) Appl. No.: 12/758,108

(22) Filed: Apr. 12, 2010

(65) Prior Publication Data

US 2011/0051329 A1    Mar. 3, 2011

(30) Foreign Application Priority Data

Aug. 26, 2009    (CN) .......................... 2009 1 0306130

(51) Int. Cl.
*H05K 5/00*    (2006.01)
*H01R 13/44*    (2006.01)

(52) U.S. Cl. ................. 361/679.01; 439/136; 200/302.1

(58) Field of Classification Search ............. 361/679.01, 361/679.34, 679.57; 439/135–150; 200/302.1
See application file for complete search history.

(56) References Cited

U.S. PATENT DOCUMENTS

| | | | | |
|---|---|---|---|---|
| 5,627,342 A * | 5/1997 | Kramer | ......................... | 174/656 |
| 6,991,490 B1 * | 1/2006 | Su | ................... | 439/521 |
| 7,083,439 B1 * | 8/2006 | Hayakawa et al. | ........... | 439/136 |
| 7,189,084 B2 * | 3/2007 | Iikura | ............................ | 439/135 |
| 7,988,468 B2 * | 8/2011 | Yang et al. | .................... | 439/136 |
| 2011/0032664 A1 * | 2/2011 | Long et al. | ................ | 361/679.01 |
| 2011/0063780 A1 * | 3/2011 | Yang | ........................ | 361/679.01 |

\* cited by examiner

*Primary Examiner* — Zachary M Pape
(74) *Attorney, Agent, or Firm* — Altis Law Group, Inc.

(57) ABSTRACT

A protective cover mechanism for a port of electronic device, includes a latching element and a cover element. The latching element has a main body and a slit defined through the main body. The cover element has a cover body, a follower protruding from the cover body slidably extending into the slit of the main body, and a stopping portion protruding from a distal end of the follower preventing the follower and the main body from separating.

16 Claims, 5 Drawing Sheets

PROTECTIVE COVER MECHANISM AND ELECTRONIC DEVICE USING THE SAME

BACKGROUND

1. Technical Field

The disclosure relates to protecting cover mechanisms and, particularly, to protecting cover mechanisms used for protecting interfaces of electronic devices.

2. Description of Related Art

Modern electronic devices provide a vast array of features that are extremely useful in organizing and communicating information. Moreover, as such devices have evolved, they have become more compact and portable so as to be available whenever and wherever needed. For example, an external interface is provided on the device for connecting the battery or battery pack to an external power source. Additionally, an external interface might be provided on a wireless telephone to allow the phone to be connected to a laptop or other computer device so that data can be transmitted from the computer over the wireless connection made by the phone.

In all these examples, an electronic device needs an external port, interface, or connector so as to be readily connected electrically to a peripheral device, accessory or network. However, such external interfaces must be protected to continue to function properly. To protect external interfaces, ports and connectors on electronic equipment, it is common to provide a cover that can, for example, be snapped or slid into place over the interface. However, there are a number of drawbacks with these arrangements.

For example, if the cover is completely removable, such as those that snap into place or are otherwise adhered to an electronic device to protect external interface ports and connectors, it is very easy to misplace and lose the cover.

Therefore, a need exists in the art for a protective cover mechanism for the external ports and connectors of an electronic device that overcomes the foregoing problems. Particularly, there is a need for a protective cover mechanism that is not readily lost when removed.

BRIEF DESCRIPTION OF THE DRAWINGS

Many aspects of the protective cover mechanism can be better understood with reference to the following drawings. These drawings are not necessarily drawn to scale, the emphasis instead being placed upon clearly illustrating the principles of the protective cover mechanism. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Embodiments will now be described in detail below and with reference to the drawings. The protective cover mechanism is suitably assembled within the portable electronic device, such as a mobile phone, a personal digital handset, or the like.

Figure 1:
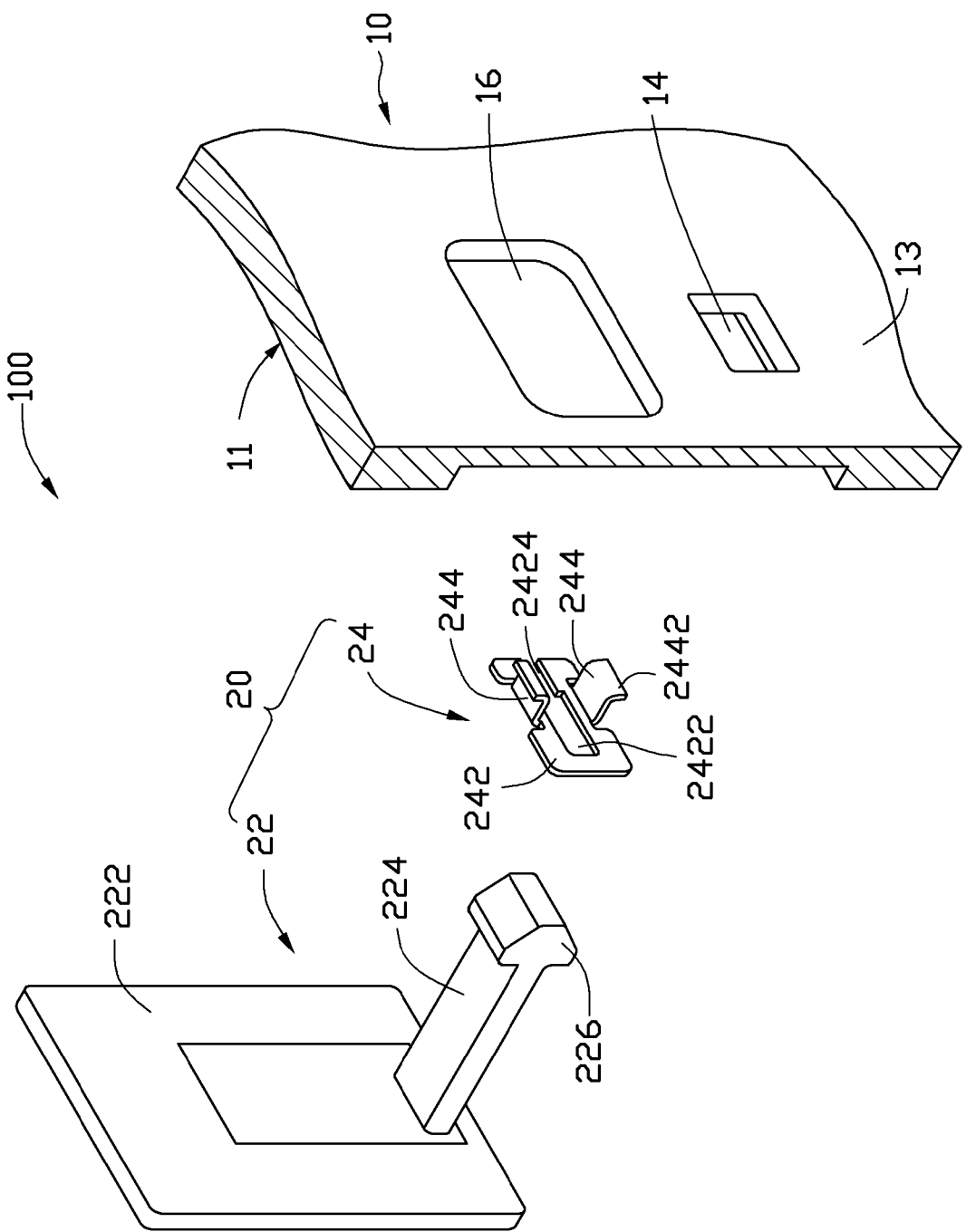
FIG. 1 is an exploded view of one embodiment of an electronic device using a protective cover mechanism.
Figure 2:
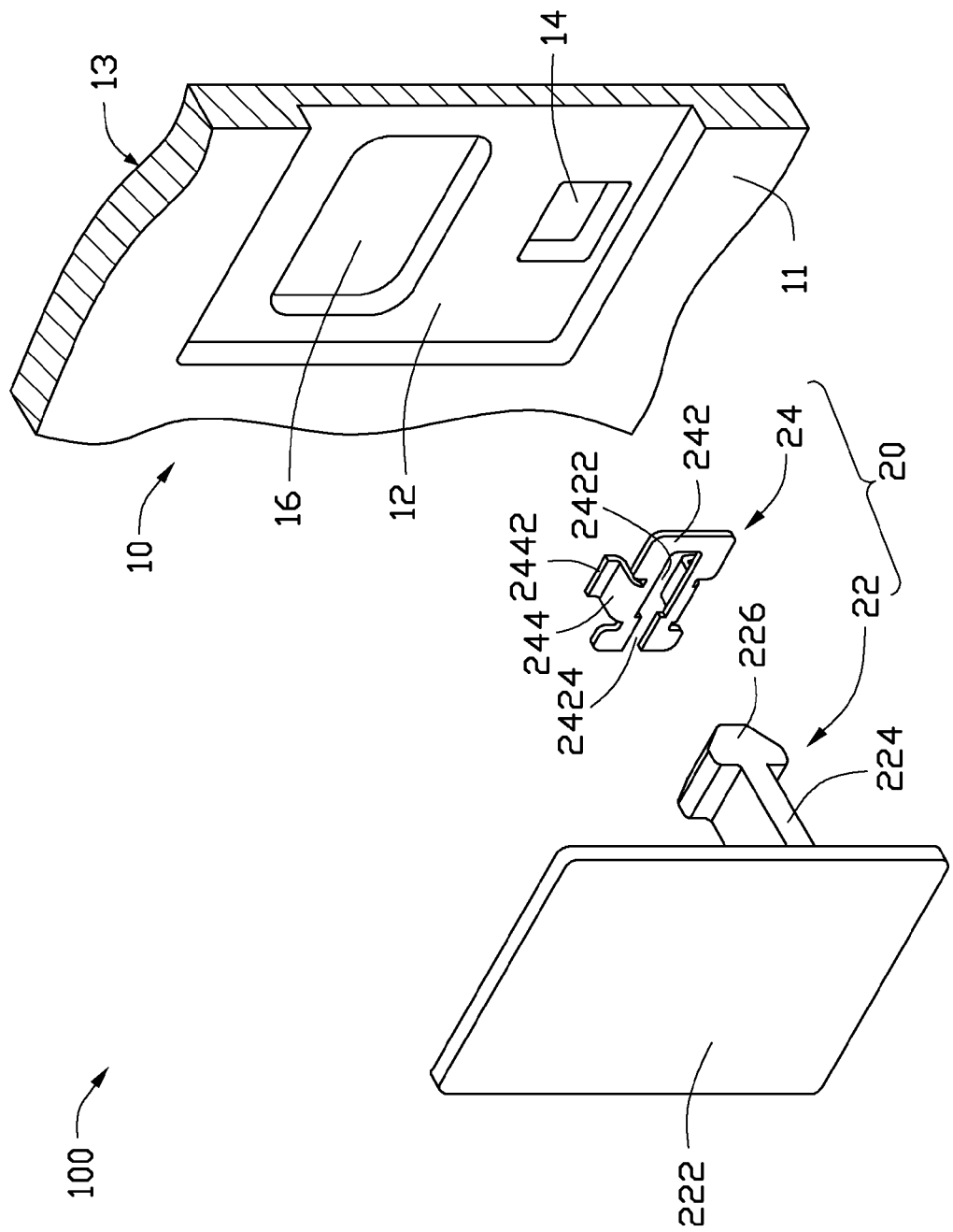
FIG. 2 is an another exploded view of the electronic device shown in FIG. 1 viewed from another aspect.
Figure 3:
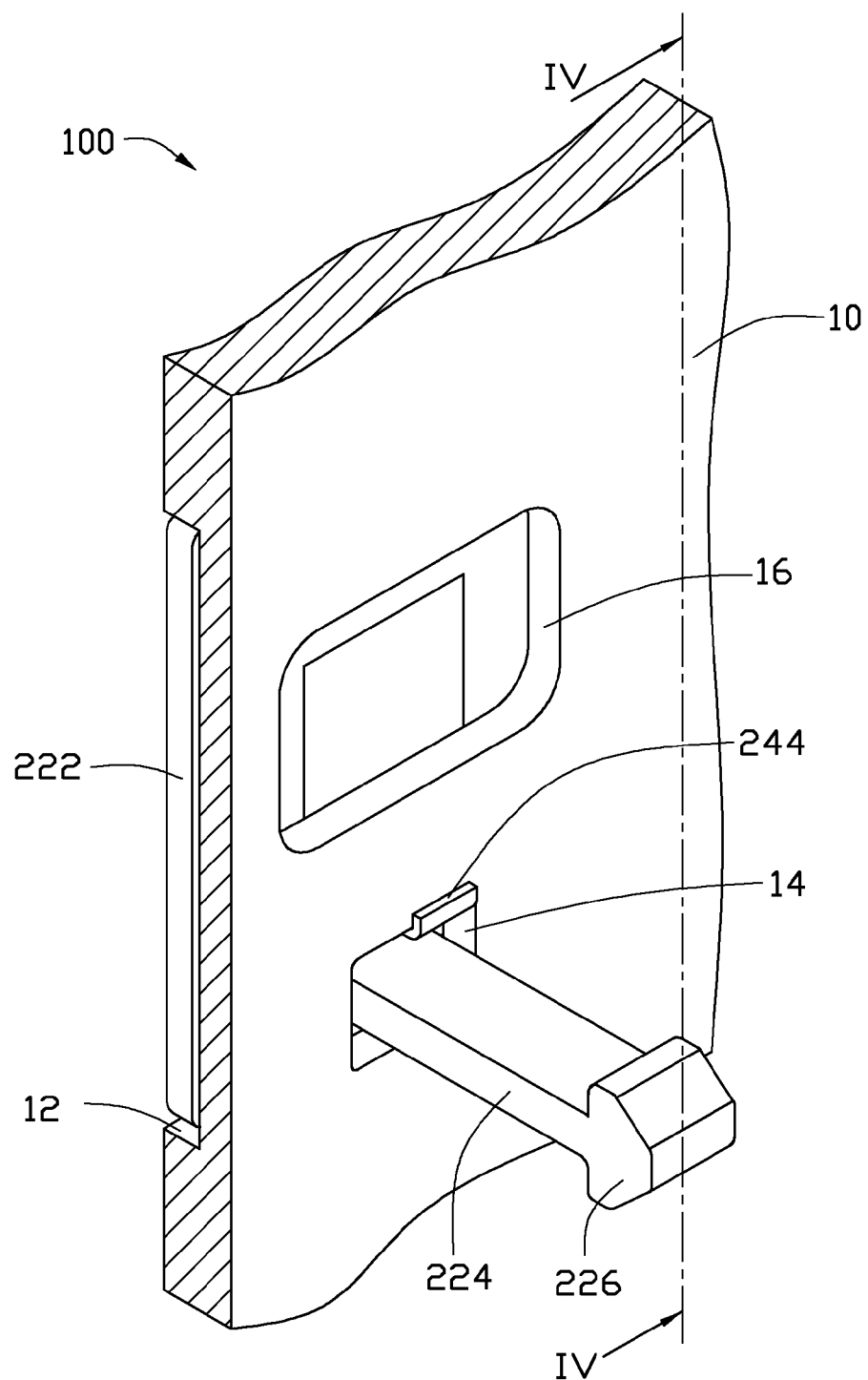
FIG. 3 is an assembled view of the electronic device in FIG. 1 when the protective cover mechanism is in a closed configuration.

Referring to FIGS. 1-3, a device 100, which may be a radio telephone in this case, includes a housing 10 and a protective cover mechanism 20. In a closed or retracted configuration 200 shown in FIG. 4, the protective cover mechanism 20 is planarly accommodated in the housing 10 to cover and protect a port 16 (e.g. USB interface) of the housing. In an extended and tilted configuration 300 shown in FIG. 5, the protective cover mechanism 20 is extended out of and tilted relative to the housing 10 so that the port 16 of the housing 10 is exposed for use.

The housing 10 includes a mounting portion 12 that can be concave and defined in an outer surface 11 of housing 10, and a latching receptacle 14 defined in an inner surface 13 of the housing 10 communicating with the mounting portion 12. The port 16 is also defined in the inner surface 13 of the housing 10 adjacent to the latching receptacle 14 communicating with the mounting portion 12.

Figure 4:
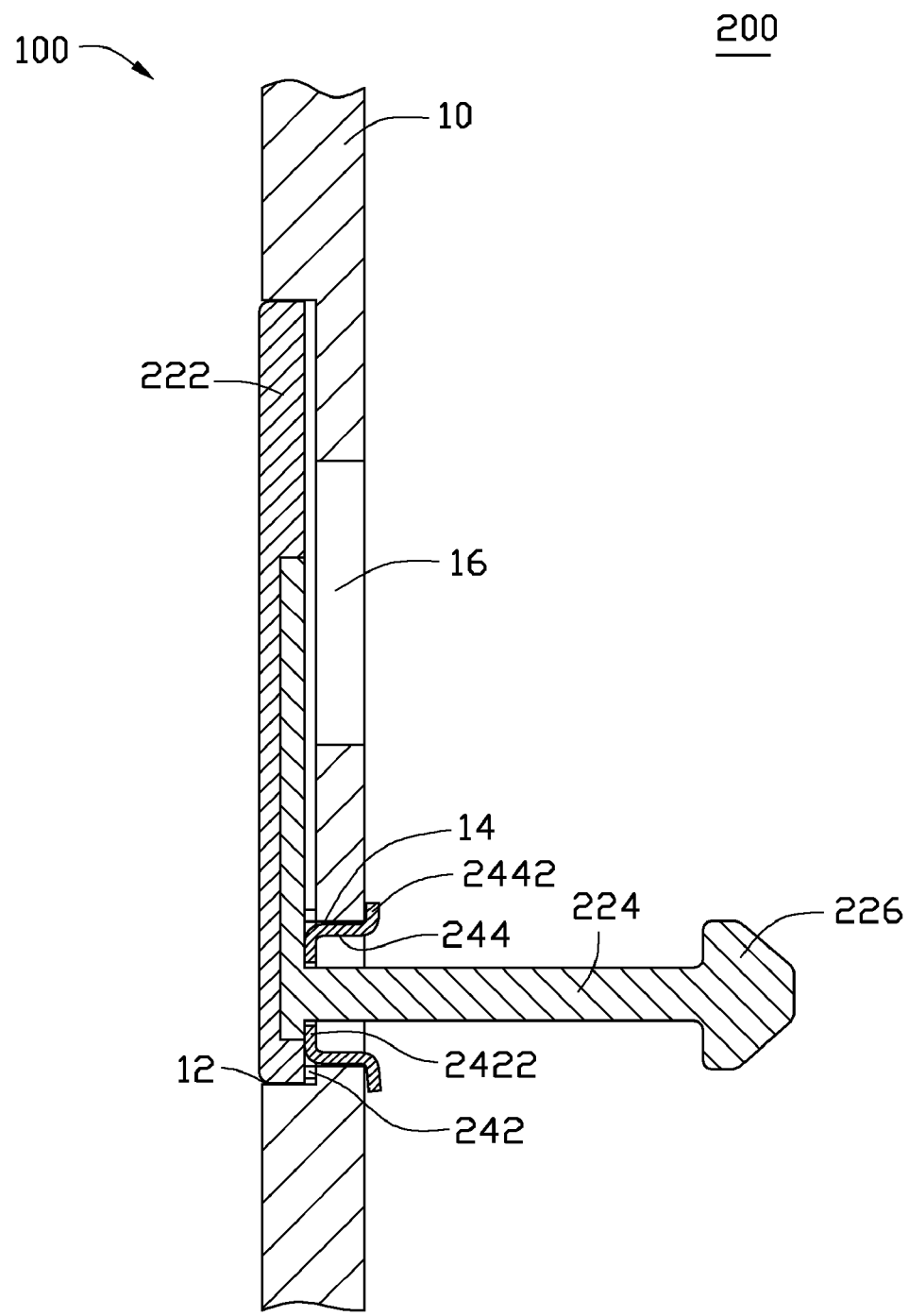
FIG. 4 is a cross sectional view of the electronic device in FIG. 3.

The protective cover mechanism 20 includes a latching element 24 latched in the latching receptacle 14 and a cover element 22 slidably secured to the latching element 24. The latching element 24 includes a main body 242 and two opposite connecting portions 244 respectively protruding from two opposite sides of the main body 242. Each of the connecting portions 244 has a retaining portion 2442 extending outwardly from a distal end thereof. Referring to FIG. 4, when the connecting portions 244 are positioned in the latching receptacle 14, the main body 242 is accommodated in the mounting portion 12 and overlaps with a bottom wall of the mounting portion 12, and the retaining portions 2442 overlap with the inner surface 13 of housing 10 so that a combination of the main body 242 and the retaining portions 2442 cooperatively retain the latching element 24 to the housing 10. It is to be understood that the latching member 24 may be retained in the latching receptacle 14 by a hot-melted method or the like, thus the retaining portions 2442 and the connecting portions 244 may be omitted.

Figure 5:
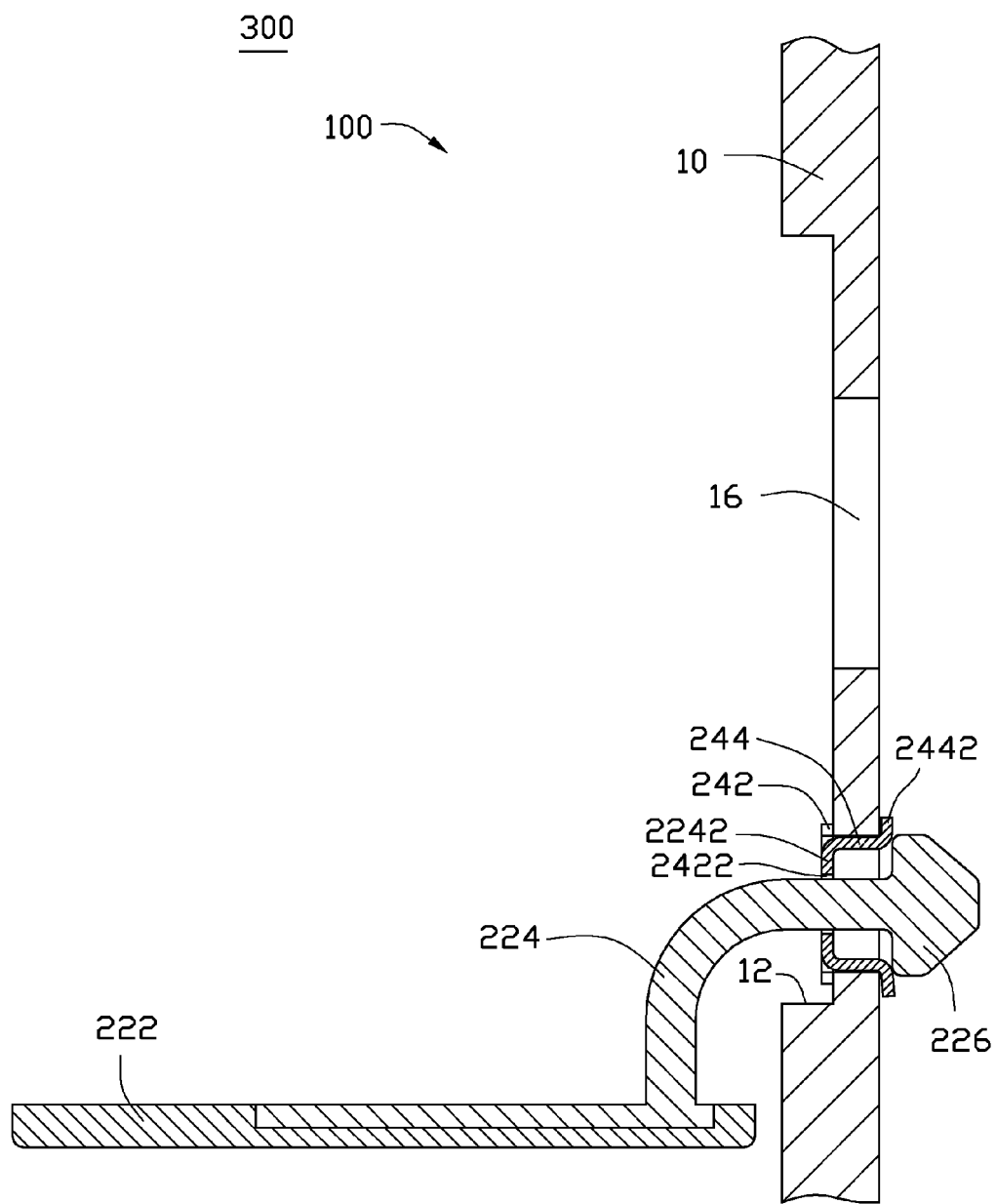
FIG. 5 is a cross sectional view of the electronic device shown in FIG. 4 when the protective cover mechanism is in an extended configuration.

The cover element 22 has a cover body 222, in this embodiment, complementary in shape to the mounting portion 12 of the housing 10. The cover body 222 is tightly accommodated in the mounting portion 12 to cover/protect the port 16 and to prevent the cover element 22 and the housing 10 from separating when the protective cover mechanism 20 is in the closed configuration 200. The main body 242 of the latching element 24 also has a slit 2422 defined therethrough and between the connecting portions 244. The cover body 22 has a follower 224, of which a cross-section has substantially the same shape and size as that of the slit 2422 and which may passes through the slit 2422. The follower 224 is slidably positioned in the slit 2422 so that the cover element 22 can be slid relative to the latching element 24 to expose the port 16. The cover element 22 also has a stopping portion 226 protruding from a distal end of the follower 224. A width of the stopping portion 226 is larger than that of the slit 2422 and a distance between the connecting portions 244 such that when the follower 224 slides in the slit 2422, the stopping portion 226 will not pass through the connecting portions and the slit 2422, to prevent the cover element 22 and the housing 10 from separating. When the cover body 222 is slid out of the mounting portion 12, the follower 224 slides relative to the housing 10 in the slit 2422, and the stopping portion 226/connecting portion 244 combination prevents the follower 224 and the latching element 24 from separating in such a manner that the stopping portion 226 resists the connecting portions 244 when the protective cover element mechanism 20 is in the extended configuration 300 as shown in FIG. 5. In other words, the stopping portion 226/slit 2422 combination prevents the cover element 22 and the housing 10 from separating when the protective cover element mechanism 20 is in the extended configuration 300. It is understood that even through the stopping portion 226 passes through the connecting portions 244, the stopping portion 226 can not pass through the slit 2422 because the stopping portion 226 is wider than the slit 2422, so the stopping portion 226 can efficiently prevent the cover element 22 and the housing 10 from separating.

A guiding groove 2424 is defined through the main body 242 communicating with the slit 2422 so as to couple the follower 224 in the slit 2422. The guiding groove 2424 is slightly narrower than the follower 224 so that the follower 224 can be steadily accommodated in the slit 2422 after the follower 224 is slid into the slit 2422 from the guiding groove 2424.

It is to be understood, however, that even through numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A protective cover mechanism for a port of an electronic device, comprising: a latching element comprising a main body and a slit defined through the main body; and
    a cover element comprising a cover body, a follower protruding from the cover body and slidably extending into the slit of the main body, and a stopping portion protruding from a distal end of the follower preventing the follower and the main body from separating;
    wherein the latching element further comprises two connecting portions protruding from two sides of the main body; the slit is defined between the connecting portions, each connecting portion comprises a retaining portion protruding outwardly from a distal end thereof to hold the latching element to the electronic device, wherein the latching element is retained in a latching receptacle of a housing of the electronic device, the cover for covering the port in the housing of the electronic device, and wherein the port and the latching receptacle are separate openings in the housing of the electronic device.

2. The protective cover mechanism as claimed in claim 1, wherein the main body further comprises a guiding groove defined therethrough communicating with the slit; the guiding groove guides the follower into the slit.

3. The protective cover mechanism as claimed in claim 2, wherein the guiding groove is narrower than the follower to stably hold the follower in the slit.

4. The protective cover mechanism as claimed in claim 1, wherein the stopping portion is wider than the slit to unreleasably retain the follower in the slit.

5. An electronic device, comprising:
    a housing comprising a port defined therein and a latching receptacle defined therethrough adjacent to the port; and
    a protective cover mechanism comprising:
        a latching element retained in the latching receptacle of the housing and comprising a slit defined therethrough; and
        a cover element comprising a cover body covering the port of the housing, a follower protruding from the cover body and slidably extending into the slit of the latching element, and a stopping portion protruding from a distal end of the follower preventing the follower and the latching element from separating.

6. The protective cover mechanism as claimed in claim 5, wherein the latching element further comprises two connecting portions protruding from two sides of the main body; the slit is defined between the connecting portions.

7. The protective cover mechanism as claimed in claim 6, wherein each connecting portion comprises a retaining portion protruding outwardly from a distal end thereof and extending through the latching receptacle and resisting the housing to hold the latching element to the housing.

8. The protective cover mechanism as claimed in claim 7, wherein the housing comprises an inner surface and an outer surface; the port and the latching receptacle are both defined in the inner surface; the housing further comprises a mounting portion defined in the outer surface communicating with both the port and the latching receptacle; the cover body is tightly accommodated in the mounting portion.

9. The protective cover mechanism as claimed in claim 8, wherein the connecting portions are positioned in the latching receptacle; the main body overlaps with a bottom wall of the mounting portion; the retaining portions overlap with the inner surface of the housing so as to hold the latching element to the housing.

10. The protective cover mechanism as claimed in claim 5, wherein the main body further comprises a guiding groove defined therethrough, communicating with the slit; the guiding groove guides the follower into the slit.

11. The protective cover mechanism as claimed in claim 10, wherein the guiding groove is narrower than the follower to steadily hold the follower in the slit.

12. The protective cover mechanism as claimed in claim 5, wherein the stopping portion is wider than the slit to unreleasably retain the follower in the slit.

13. An electronic device, comprising:
    a housing comprising a port defined therein and a latching receptacle defined therethrough adjacent to the port; and
    a protective cover mechanism comprising:
        a latching element retained in the latching receptacle of the housing and comprising a slit defined therethrough; and
        a cover element comprising a cover body covering the port of the housing when the protective cover mechanism is in a closed configuration, a follower protruding from the cover body and slidably extending into the slit of the latching element, and a stopping portion protruding from a distal end of the follower resisting the latching element and preventing the latching element and the cover element from separating when the protective cover mechanism is in an extended configuration.

14. The protective cover mechanism as claimed in claim 13, wherein the housing comprises an inner surface and an outer surface; the port and the latching receptacle are both defined in the inner surface; the housing further comprises a mounting portion defined in the outer surface communicating with both the port and the latching receptacle; the cover body is tightly accommodated in the mounting portion when the protective cover mechanism is in the closed configuration.

15. The protective cover mechanism as claimed in claim 13, wherein the latching element is retained in the latching receptacle of the housing by a hot-melted method.

16. The protective cover mechanism as claimed in claim 13, wherein the stopping portion is wider than the slit to unreleasably retain the follower in the slit.

* * * * *